United States Patent
Rinker et al.

(10) Patent No.: US 6,450,531 B1
(45) Date of Patent: Sep. 17, 2002

(54) ANTI-FRICTION CAM-OPERATED FRICTION DISK CLUTCH

(75) Inventors: Kurt H. Rinker, Ann Arbor; Richard T. Chauvin, Clawson; William A. Jolley, Waterford, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/753,583

(22) Filed: Jan. 3, 2001

(51) Int. Cl.[7] ................................................. B62D 1/18
(52) U.S. Cl. .......................... 280/775; 280/777; 74/493
(58) Field of Search .................. 280/775, 777; 74/493

(56) References Cited

U.S. PATENT DOCUMENTS

| | | | |
|---|---|---|---|
| 3,881,366 A | * 5/1975 | Bradley et al. | ................ 74/493 |
| 4,244,237 A | 1/1981 | Sprunger | |
| 5,361,646 A | 11/1994 | Venable | |
| 5,461,937 A | * 10/1995 | Cymbal | ........................ 74/493 |
| 5,527,068 A | 6/1996 | Schneider | |
| 5,555,772 A | * 9/1996 | Schneider | ..................... 74/493 |
| 5,655,413 A | 8/1997 | Barton | |
| 5,787,759 A | * 8/1998 | Olgren | ........................ 74/493 |
| 5,979,938 A | * 11/1999 | Menjak et al. | .............. 280/775 |
| 5,988,679 A | 11/1999 | Schelling | |

* cited by examiner

Primary Examiner—Anne Marie Boehler
Assistant Examiner—Deanna Draper
(74) Attorney, Agent, or Firm—Ralph E. Smith

(57) ABSTRACT

A vehicle steering column can be frictionally locked in selected positions of adjustment by a cam-operated friction disk clamping mechanism. The cam operator includes a rotary shaft having an anti-friction thrust bearing on one end and an anti-friction cam mechanism on the other end. Anti-friction elements in the bearing and cam mechanism enable the shaft to be easily operated, while permitting the friction disks to have a strong clamping action.

12 Claims, 3 Drawing Sheets

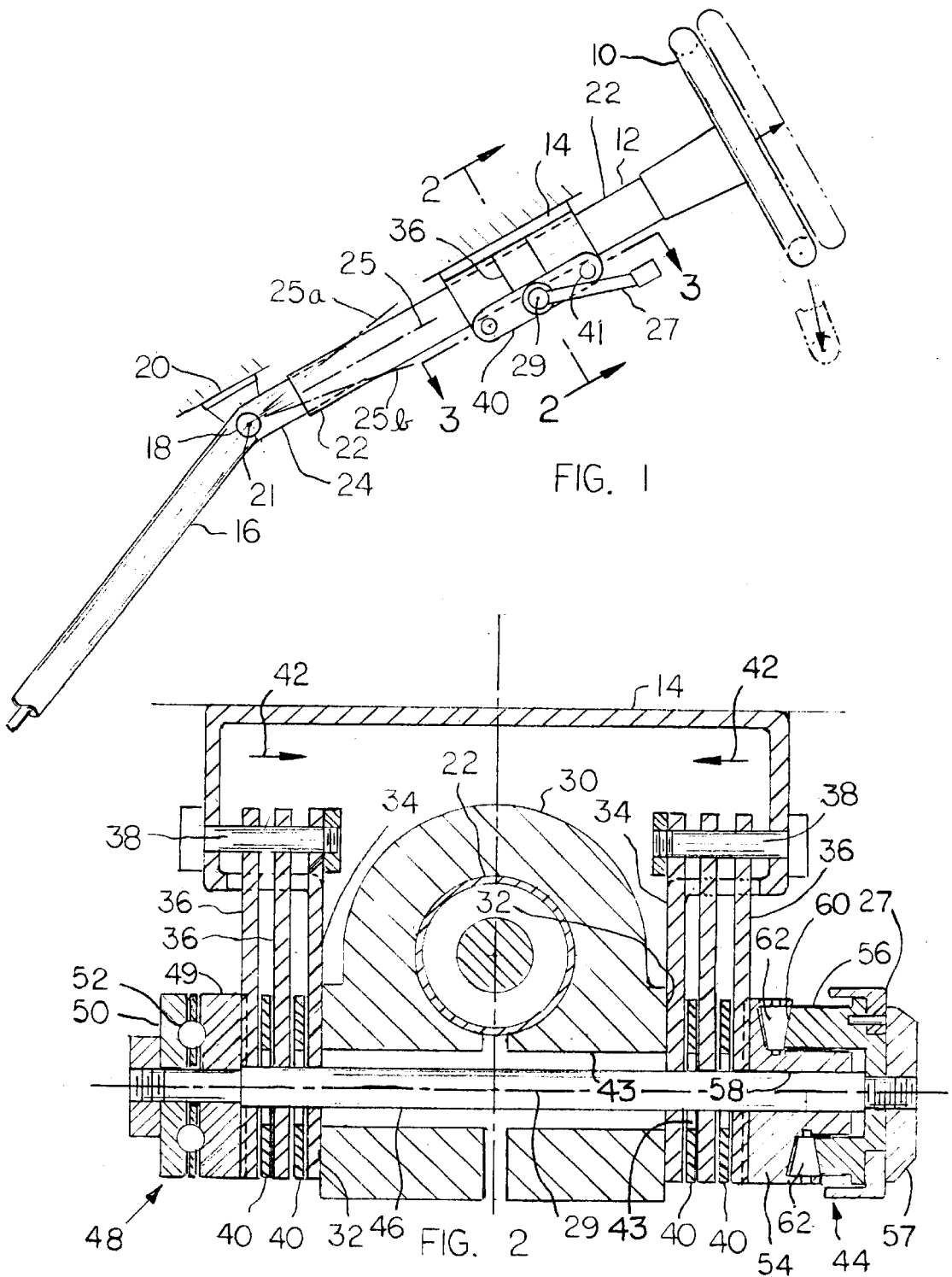

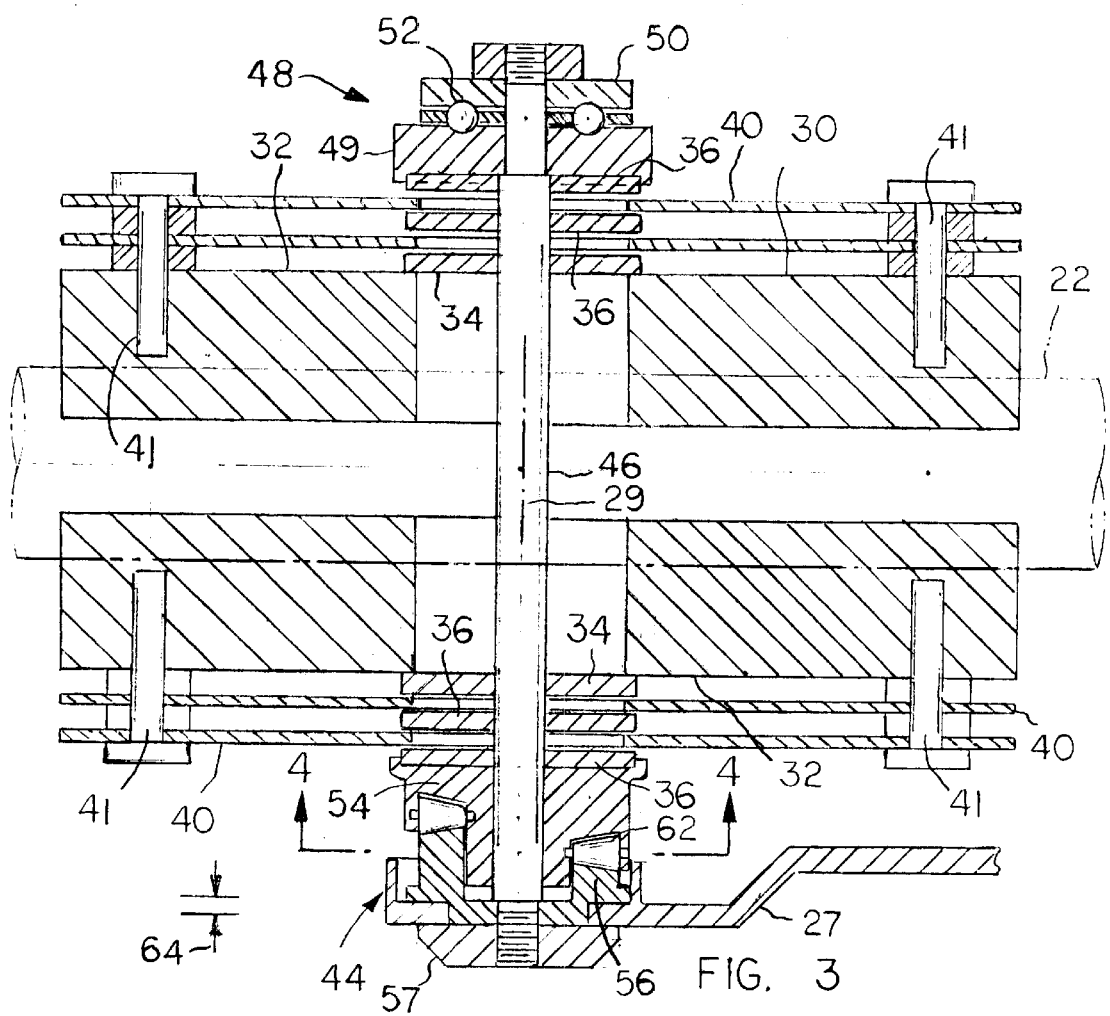
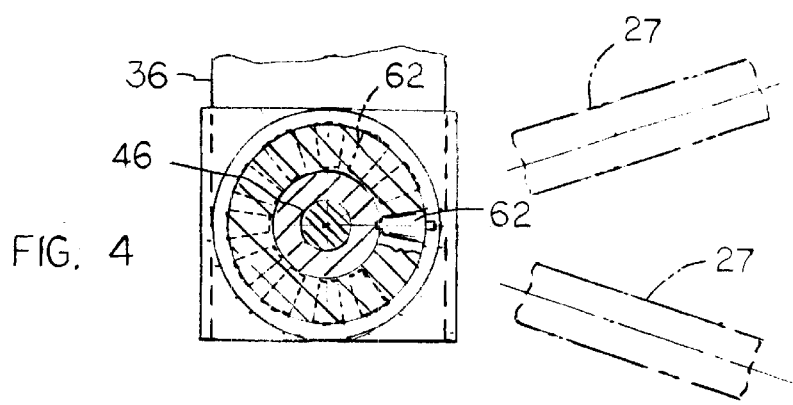

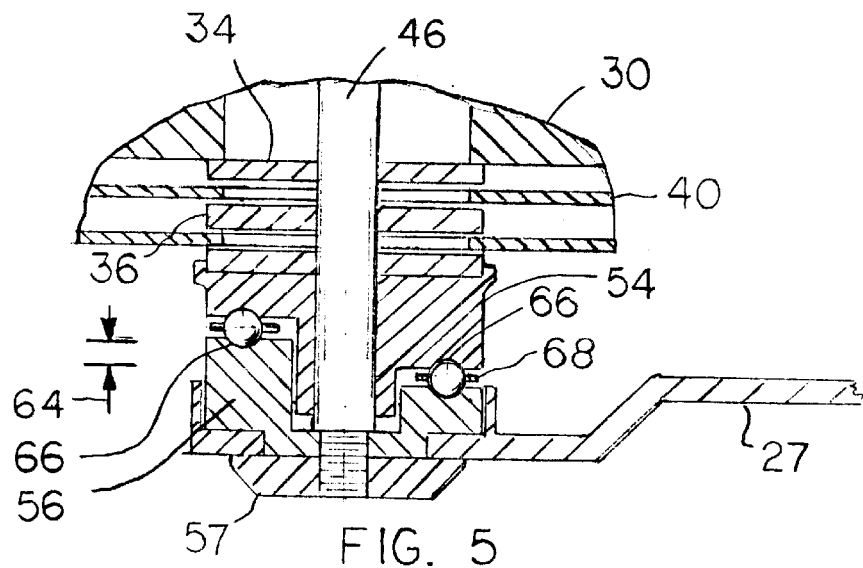
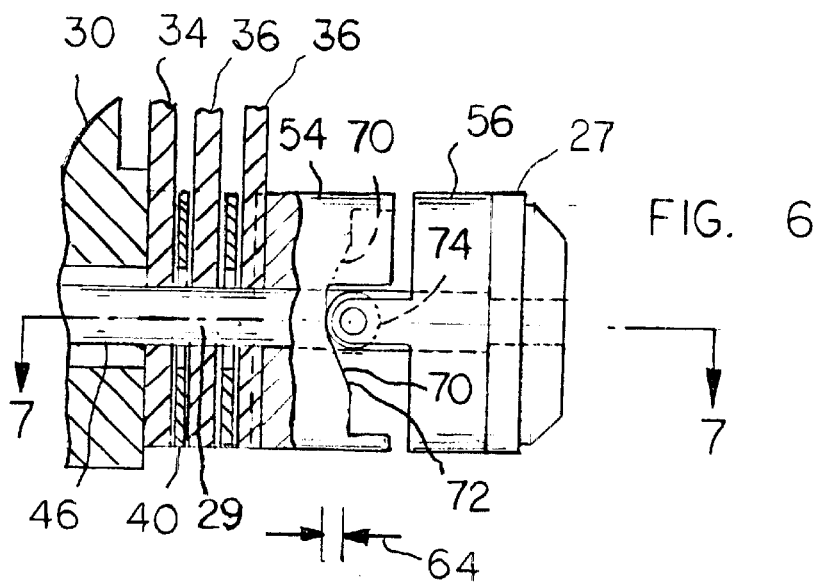
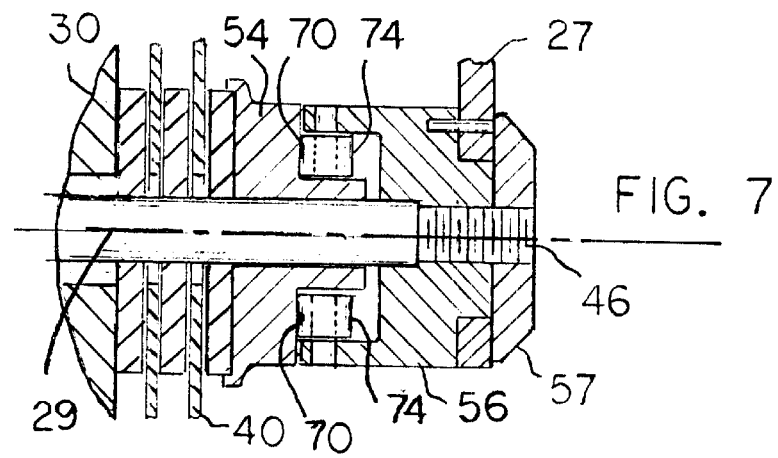

ANTI-FRICTION CAM-OPERATED FRICTION DISK CLUTCH

FIELD OF THE INVENTION

This invention relates to a cam-operated mechanism for clamping a vehicle steering column in a range of different adjusted positions.

BACKGROUND OF THE INVENTION

A vehicle steering column can be adjusted in accordance with different user preferences. Typically, the adjustment can be a tilt type adjustment around a horizontal axis extending transversely across the steering column, about one foot in front of the steering wheel. The driver of the vehicle can operate a manual lever on the steering column near the steering wheel, to vary the plane of the steering wheel to an inclination he considers to be most comfortable or preferable from an operating standpoint. In some vehicles the steering column can be slidably adjusted, to move the steering wheel toward or away from the driver.

For safety reasons the steering wheel and steering column should be securely locked in any selected position of adjustment. In some cases the adjusting mechanism includes detent notches or ratchet teeth that provide a positive locking action. In other cases the adjusting mechanism includes a friction lock, usually plural friction disks that are moved together by a manually controlled mechanism. A friction lock is advantageous in that the steering column and steering wheel can have a relatively large or infinite number of adjusted positions, as opposed to a lesser number of discrete positions achieved with detent notches.

When the friction lock is operated by a cam mechanism the cam operator can include a rotary shaft extending through clearance openings in the friction disks. A cam on the shaft is aligned with a cam follower carried by one set of friction disks. Manual rotation of the shaft (by means of a manual lever carried by the shaft) causes the cam to exert an axial force on the cam follower, whereby the friction disks are brought into pressure contact with one another. The frictional pressure contact between the friction disks holds the steering column and steering wheel in any selected position of adjustment.

One problem with typical friction locks is that the frictional pressure force existing between the friction disks is transmitted through the cam follower onto the cam operator. The cam operator becomes frictionally locked to the cam follower, so that the person has some difficulty in moving the lever to the unlocked position. On the other hand, when the person attempts to move the manual lever from the unlocked position to the locked position, the build up of frictional forces can cause the cam operator to prematurely frictionally lock to the cam follower, so that the friction disks fail to lock together with a sufficient frictional pressure. When the person exerts pressure on the steering wheel the wheel can abruptly move from a stable position in an uncontrolled fashion.

SUMMARY OF THE INVENTION

The present invention relates to a friction lock mechanism for a steering column, wherein the interface between a cam operator and cam follower is comprised of anti-friction elements. When the driver swings the manual lever up or down, the individual anti-friction elements rotate to relieve frictional drag between the cam and cam follower. The manual lever can thereby be more easily moved to the locked, or unlocked, position. The friction disks can have a relatively high pressure contact without requiring an abnormally great manual force on the operating lever.

The rotary anti-friction elements can be carried by the cam follower or by the cam operator. In another arrangement the anti-friction elements can be floatably positioned between the cam and cam follower. Whatever the specific arrangement, the anti-friction elements minimize frictional drag between the cam and cam follower, with resultant advantages as regards a greater disk friction lock action and a lower manual operating force requirement.

Additional features and advantages of the invention will be apparent from the attached drawings and description of an illustrative embodiment of the invention.

BRIEF DESCRIPTION OF THE DRAWINGS

FIG. 1 is a schematic side elevational view of a vehicle steering column having a frictional locking means of the present invention installed thereon.

FIG. 2 is an enlarged transverse sectional view taken on line 2—2 in FIG. 1

FIG. 3 is an enlarged sectional view taken on line 3—3 in FIG. 1

FIG. 4 is a fragmentary sectional view taken on line 4—4 in FIG. 3

FIG. 5 is a fragmentary sectional view taken in the same direction as FIG. 3, but showing another form that the invention can take.

FIG. 6 is a fragmentary sectional view taken in the same direction as FIG. 2, but illustrating another embodiment of the invention FIG. 7 is a fragmentary sectional view taken on line 7—7 in FIG. 6

DESCRIPTION OF A PREFERRED EMBODIMENT OF THE INVENTION

Referring to FIG. 1, there is fragmentarily shown a vehicle steering system that includes a steering wheel 10 carried on the upper end of an upper steering column assembly 12. A mounting bracket 14 is attached to the vehicle chassis for supporting the upper steering column assembly.

A lower steering column assembly 16 has a pivotal connection 18 with the upper steering column assembly at a second mounting bracket 20. Upper steering column assembly 12 includes an outer tubular column member 22 that has a slidable telescopic fit on an inner tubular column member 24, whereby the outer column member can be slidably adjusted along the upper steering column assembly axis to vary the position of steering wheel 10. FIG. 1 shows two positions that the steering wheel can take (to bring the steering wheel toward the driver or away from the driver).

Pivotal connection 18 enables the upper steering column assembly to be tiltably adjusted around a transverse pivot axis 21 whereby steering wheel 10 can have different inclinations. FIG. 1 shows the upper steering column set so that its longitudinal axis is represented by numeral 25. The upper steering column can be tilted upwardly around pivot axis 21 to various positions, e.g. a position wherein the column axis is represented by numeral 25a or a lowered position wherein the column axis is represented by numeral 25b.

By way of summarization, the upper steering column assembly has two separate adjustments, i.e. a first slidable adjustment along the steering column axis, and a second tilt adjustment around axis 21 of pivot connection 18. These adjustments can be achieved separately, or in combination, by a suitable manual force applied to the steering wheel.

To lock the upper steering column assembly in selected positions of adjustment, there is provided a friction lock clamping system controlled by a manual lever 27. In the particular system herein shown, lever 27 is swingable upwardly around a transverse axis 29 to lock the clamping system; the lever is manually swung downwardly to unlock the clamping system. With the clamping system in the unlocked condition, the upper steering column assembly can be adjusted, as previously described. In the locked condition of the clamping system, the upper steering column has a fixed stable positioning in the vehicle.

FIGS. 2 and 3 illustrate some features of the friction lock clamping system. Upper steering column assembly 12 includes a slide member 30 secured to tubular column member 22 so that flat side surfaces 32 of member 30 are in slidable contact with two flat disk-like guide elements 34 extending downwardly from mounting bracket 14. The upper steering column assembly is restrained against lateral play, but can be adjusted in the vertical plane (tiltably and or slidably), as previously described.

Guide elements 34 are spaced inwardly from two additional flat disk elements 36 that are suspended from pins 38 suitably connected to bracket 14. Elements 34 and 36 are stationary in the vertical plane. However, disk elements 36 are capable of transverse movement on pins 38, such that elements 36 can be drawn toward elements 34 in order to lock steering column assembly 12 in selected positions of adjustment.

The clamping (locking) mechanism includes four friction disks 40 carried by slide member 30 in interspersed relation to disk elements 34 and 36. As shown in FIG. 3, disks 40 are attached to slide member 30 by means of pins 41 located a few inches on either side of disk elements 34 and 36. Disks 40 are preferably flexible steel strips that can bend slightly when disk elements 36 are moved toward the associated disk elements 34 (by a cam mechanism 44 located on transverse shaft 46).

When disk elements 36 are brought toward disk elements 34, as denoted by arrows 42 in FIG. 2, the interspersed disks 40 are frictionally locked to disk elements 34 and 36, to thereby hold the upper steering column assembly 12 in an adjusted position. Disks 40 and slide member 30 are formed with clearance slots 43 so that the steering column assembly can be adjusted (slidably and/or tiltably) without interference from shaft 46. Shaft 46 is rotatably mounted on bracket 14 so that its axis 29 is fixed. However, shaft 46 can slide on axis 29.

The mounting mechanism for shaft 46 includes an anti-friction thrust bearing assembly 48 attached to one disk element 36 and an anti-friction cam mechanism 44 attached to the other disk element 36.

Bearing assembly 48 includes a first race 49 welded, or otherwise secured to, the associated disk element 36, a second race 50 secured to shaft 46, and anti-friction elements 52 interposed between the two races. Axial loadings on the shaft are applied to the anti-friction elements so that such loadings provide only minimal resistance to shaft rotation.

Cam mechanism 44 includes a cam follower 54 welded, or otherwise secured to, the associated disk element 36; and a rotary cam member 56 secured to one end of shaft 46, e.g. by a nut 57. In the illustrated arrangement, nut 57 also clamps lever 27 to the shaft. When a manual turning force is applied to lever 27, shaft 46 rotates on axis 29. Inner annular surface 58 on cam follower 54 serves as a radial bearing for the shaft.

End surface 60 on cam member 56 has a helical contour concentric around shaft axis 29. Cam follower 54 has a row of anti-friction rollers 62 arranged in a helical pattern concentric around the shaft axis. As the shaft is turned around axis 29, helical surface 56 moves along the anti-friction rollers, so that cam 56 has a screw-like motion around (and along) axis 29. Anti-friction rollers 62 rotate around their individual axes, to relieve frictional drag between cam surface 60 and the cam follower. Rollers 62 form a low friction interface between cam 56 and cam follower 54 during shaft 46 rotational movement.

Shaft 46 rotation in one direction causes cam end surface 60 to advance (in screw-like fashion) toward anti-friction bearing assembly 48, whereby the two friction disk elements 36 are moved toward one another, as denoted by arrows 42 in FIG. 2. Disk elements 36 move toward the associated disk elements 34, so that friction disks 40 are frictionally locked to disk elements 34 and 36, thereby holding the upper steering column assembly in its adjusted position. Shaft 46 rotation in the other direction allows cam end surface 60 to move away from bearing assembly 48, thereby producing slight separations between disks 40 and disk elements 34 and 36, sufficient to permit any desired readjustment of the upper steering assembly 12.

The stroke of lever 27, to achieve a desired locking (clamping) action can be relatively slight, e.g. on the order of thirty five degrees measured around shaft axis 29. The corresponding axial displacement of cam follower 54 is relatively small (i.e. enough to permit only slight separations between the friction elements). In FIG. 3, the axial stroke is indicated by numeral 64. The axial separation of the friction disks and disk elements is somewhat exaggerated in FIGS. 2 and 3, for illustration purposes.

The number of anti-friction rollers 62 employed on cam follower 54 can be varied while still practicing the invention. Typically, eleven rollers spaced thirty degrees apart, can be employed. As previously noted, the rollers are arranged in a helical pattern concentric around shaft axis 29. The pitch of the roller helix pattern is the same as the helical pitch on cam surface 60, so that surface 60 remains in continuous contact with the rollers during shaft rotation.

The loadings on cam 56 are primarily axial in nature. Such loadings are applied (in opposite directions) to anti-friction elements 52 and 62, so that shaft 46 can be turned with a relatively small manual pressure on lever 27, even though the frictional forces between friction elements 34, 36 and 40 are relatively large as the clamping mechanism nears the locking condition. A high friction locking condition can be realized with only a small manual turning force. The manual force required to unlock the clamping mechanism can be correspondingly small.

As previously noted, the anti-friction elements for the cam mechanism can be located on the cam follower, or on the cam, or in the interface between the cam and cam follower.

FIG. 5 shows a construction of the present invention, wherein anti-friction elements (balls) 66 are located in the interface between cam member 56 and cam follower 54. A floating cage 68 retains the anti-friction elements 66 in positions spaced slightly apart along two opposed helical races formed in the opposing surfaces of the cam and cam follower. Cage 68 has a helical configuration of the same pitch as the races, whereby anti-friction elements 66 have continuous contact with the races during shaft rotation. The FIG. 5 construction operates in essentially the same anti-friction mode as the earlier described construction.

FIGS. 6 and 7 illustrate another form of the invention, wherein the anti-friction elements are located on cam member 56. In this case, cam follower 54 has two mirror image cam surfaces 70 extending partway around the cam follower circumference. Each cam surface includes a ramp area 72 that achieves the desired axial stroke 64 when shaft 46 is turned around the shaft axis.

Anti-friction rollers 74 are located on cam member 56 in rolling contact with cam surfaces 70, whereby the rollers move along the cam surface as shaft 46 rotates on axis 29. During shaft rotation in the clamping direction, rollers 74 climb the two ramps 72 to move cam follower 54 leftwardly (as viewed in FIGS. 6 and 7). During shaft rotation in the unclamping direction, rollers 74 return to the conditions depicted in FIGS. 6 and 7, thereby allowing the frictional clamping elements to slightly separate, as previously described.

Although not shown in the drawings, the embodiments depicted in FIGS. 5, 6 and 7 will include anti-friction thrust bearings of the type shown at 48 in FIG. 2. A primary feature of the invention is the employment of an anti-friction thrust bearing in combination with an anti-friction cam assembly, whereby the operating shaft 46 can be turned with a relatively small manual effort, while still achieving a strong frictional locking action between friction disks 40 and friction disk elements 34 and 36.

What is claimed:

1. A vehicle steering column assembly comprising:
   a steering column that is adjustable between a range of different adjusted positions;
   a mounting bracket for said steering column; and
   means coupled to said mounting bracket and said steering column for releasably clamping said column in selected positions of adjustment;
      said releasable clamping means comprising a first friction disk means carried by said bracket, a second friction disk means carried by said steering column, a rotary actuating shaft extending transversely through said first and second friction disk mean, and cam means between said rotary shaft and said first friction disk means for releasably locking said first and second friction disk means together in response to manual rotation of said shaft;
      said cam means comprising a rotary cam carried by said shalt, a cam follower carried by said first friction disk means and anti-friction means interposed between said cam and said cam follower; said anti-friction means comprising individual anti-friction elements that rotate to relieve frictional drag between the cam and cam follower during shaft rotational movement.

2. The steering column assembly of claim 1, wherein said anti-friction elements are carried by said cam follower.

3. The steering column assembly of claim 1, wherein said anti-friction elements are carried by said cam.

4. The steering column assembly of claim 1, wherein said anti-friction elements are floatably positioned between said cam and said cam follower.

5. The steering column of claim 1, and further comprising an anti-friction thrust bearing carried by said first friction disk means for supporting said rotary shaft.

6. The steering column of claim 1, wherein said rotary shaft has first and second ends spaced apart on either side of said first and second friction disk means; said cam means being located on the first end of the rotary shaft; and an anti-friction thrust bearing carried by said first friction disk means on the second end of said rotary shaft;
   said shaft extending through said thrust bearing so that said bearing absorbs axial loads imposed on the shaft by said cam means.

7. The steering column of claim 6, wherein said thrust bearing comprises an annular race carried by said first friction disk means, a second race secured to said shaft, and individual anti-friction elements located between said races.

8. A vehicle steering column assembly comprising:
   a steering column that is adjustable between a range of different adjusted positions;
   a mounting bracket for said steering column, and
   means coupled to said mounting bracket and said steering column for releasably clamping said column in selected positions of adjustment;
      said releasably clamping means comprising a first set of friction disks carried by said bracket, a second set of friction disks carried by said steering column in interspersed relation to the disks in said first set, a rotary actuating shaft extending transversely through said fist and second sets of friction disks, cam means located between said shaft and said friction disks for releasably drawing said friction disks together in response to manual rotation of said shaft, and an anti-friction trust bearing carried by said friction disks for supporting said rotary shaft; said friction disks being located between said cam means and said thrust bearing so that said trust bearing absorbs axial loads imposed on the shaft by said cam means;
      said cam means comprising a rotary cam carried by said shaft, a cam follower carried by said first friction disk means, and anti-fiction means interposed between said cam and said cam follower; said anti-friction means comprising individual anti-friction elements that rotate to relieve frictional drag between the cam and cam follower during shaft rotational movement.

9. The steering column assembly of claim 8, wherein said anti-friction elements are carried by said cam follower.

10. The steering column assembly of claim 8, wherein said anti-friction elements are carried by said cam.

11. The steering column assembly of claim 8, wherein said anti-friction elements are floatably positioned between said cam and said cam follower.

12. The steering column of claim 8, wherein said thrust bearing comprises an annular race carried by said first set of friction disks, a second race secured to said shaft, and individual anti-friction elements located between said races.

* * * * *